UNITED STATES PATENT OFFICE.

KRISTIAN GEELMUYDEN, OF NOTODDEN, TELEMARKEN, NORWAY, ASSIGNOR TO NORSK HYDRO-ELEKTRISK KVAELSTOFAKTIESELSKAB, OF CHRISTIANIA, NORWAY.

PROCESS OF PURIFYING NITRITE SOLUTIONS.

No. 907,332.      Specification of Letters Patent.      Patented Dec. 22, 1908.

Application filed May 28, 1908. Serial No. 435,564.

*To all whom it may concern:*

Be it known that I, KRISTIAN GEELMUYDEN, a subject of the King of Norway, residing at Notodden, Telemarken, Norway, have invented certain new and useful Improvements in Processes of Purifying Nitrite Solutions; and I do hereby declare the following to be a full, clear, and exact description of the invention, such as will enable others skilled in the art to which it appertains to make and use the same.

This invention consists in a method of producing pure nitrite of sodium from a solution of nitrite containing bicarbonate.

Solutions of sodium nitrite, such, for instance, as are produced by the absorption of nitrous gases in a solution of carbonate of soda, frequently contain sodium bicarbonate. The latter is objectionable for the reason, that, when the nitrite is crystallized out, the bi-carbonate does not remain in the solution, and consequently the nitrite will become impure by being mixed with said substance.

According to the present invention this impurity is avoided by transforming the bicarbonate into carbonate before the crystallization takes place, the carbonate being, at ordinary temperature, considerably more easily soluble than the bicarbonate and therefore remains in solution, when the crystallization takes place. The conversion of the bicarbonate into monocarbonate may, for instance, be easily effected by exposing the solution to a heat of about 130 degrees centigrade before the crystallization, so as to drive off the carbonic acid; this is suitably performed by a process of evaporation carried on to a concentration of about 75 per cent. of sodium nitrite ($NaNO_2$). After the evaporation has been completed, water is added thereby dissolving again any soda that may eventually have been separated. The quantity of water to be added depends on the relative proportions of the constituents of the solution. The mother-lye of the separated nitrite contains all the soda and may be utilized for further absorption.

I claim:

1. The process of purifying nitrite solutions consisting in exposing a solution of nitrite containing bi-carbonate to heat until the carbonic acid is driven off, and adding water to the remaining solution.

2. The process of purifying nitrite solutions consisting in exposing a solution of nitrite containing bi-carbonate to a heat sufficient to drive off the carbonic acid, and adding to the remaining solution a quantity of water proportionate to the constituents of said remaining solution.

3. The process of obtaining pure alkaline nitrites from mixed solutions thereof containing a bi-carbonate of an alkaline metal, which comprises heating said solution sufficiently to convert the bi-carbonate into mono-carbonate, and crystallizing the alkaline nitrite therefrom after said conversion.

4. The process of obtaining pure alkaline nitrites from mixed solutions thereof containing bi-carbonate of soda, which comprises heating said solution sufficiently to convert the bi-carbonate into mono-carbonate and crystallizing the nitrite from said solution after the conversion.

In testimony that I claim the foregoing as my invention, I have signed my name in presence of two subscribing witnesses.

KRISTIAN GEELMUYDEN.

Witnesses:
  HEPWAN KERVEL BARTH,
  FRIMANN NERGAARD.